US012404927B1

(12) United States Patent
Chung et al.

(10) Patent No.: US 12,404,927 B1
(45) Date of Patent: Sep. 2, 2025

(54) CYCLOID SPEED REDUCER ASSEMBLY

(71) Applicant: Delta Electronics, Inc., Taoyuan (TW)

(72) Inventors: Chi-Wen Chung, Taoyuan (TW); Wei-Ying Chu, Taoyuan (TW); Chin-Hsiang Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 18/825,961

(22) Filed: Sep. 5, 2024

Related U.S. Application Data

(60) Provisional application No. 63/631,617, filed on Apr. 9, 2024.

(30) Foreign Application Priority Data

Aug. 16, 2024 (CN) .......................... 202411127813.7

(51) Int. Cl.
| | |
|---|---|
| *F16H 1/32* | (2006.01) |
| *F16H 57/021* | (2012.01) |
| *F16H 61/00* | (2006.01) |
| *F16H 63/50* | (2006.01) |

(52) U.S. Cl.
CPC ........... *F16H 61/0006* (2013.01); *F16H 1/32* (2013.01); *F16H 57/021* (2013.01); *F16H 63/50* (2013.01); *F16H 2001/323* (2013.01)

(58) Field of Classification Search
CPC ........................................ F16H 1/32–2001/328
See application file for complete search history.

(56) References Cited

U.S. PATENT DOCUMENTS

| | | | | |
|---|---|---|---|---|
| 6,492,787 | B1 * | 12/2002 | Hibino | G01D 5/24404 901/29 |
| 7,988,581 | B2 * | 8/2011 | Kobayashi | F16H 1/32 475/162 |
| 9,556,933 | B2 * | 1/2017 | Fujimoto | F16H 1/32 |
| 9,976,629 | B2 * | 5/2018 | Shen | F16H 57/08 |
| 10,673,304 | B2 * | 6/2020 | Tsai | H02K 7/116 |

(Continued)

FOREIGN PATENT DOCUMENTS

| | | | | |
|---|---|---|---|---|
| CN | 103968009 A | * | 8/2014 | ............... F16H 1/32 |
| CN | 105020345 A | | 11/2015 | |

(Continued)

*Primary Examiner* — Sherry L Estremsky
(74) *Attorney, Agent, or Firm* — KIRTON McCONKIE; Evan R. Witt

(57) ABSTRACT

A cycloid speed reducer assembly is disclosed for optimizing the component structure. The accommodation space required for the sealing element is integrated into the track ring to save the material costs and significantly reduce the overall volume. A spacer ring placed between the front and rear bearings is used to adjust the clearances of the front bearing and the rear bearing to facilitate the quantitative production and control the yield. Since the compact structure of the cycloid speed reducer assembly includes two output ends, it facilitates to arrange an encoder between the speed reducer and the motor for closed-loop feedback control, so as to improve the control accuracy of the system. With the hollow input shaft, dual encoder applications can be realized. When a flexible structure is added to the output end, the flexible structure can be connected to another encoder to further realize the application of the torque sensor.

15 Claims, 10 Drawing Sheets

(56) References Cited

U.S. PATENT DOCUMENTS

| | | | |
|---|---|---|---|
| 10,677,321 B2 * | 6/2020 | Tsai | ............... H02K 7/116 |
| 11,486,469 B2 | 11/2022 | Chung et al. | |
| 11,555,531 B1 | 1/2023 | Chung et al. | |
| 11,841,073 B2 | 12/2023 | Kihira | |
| 2019/0207470 A1 * | 7/2019 | Uematsu | ............... F16H 57/02 |

FOREIGN PATENT DOCUMENTS

| | | | | |
|---|---|---|---|---|
| CN | 107237866 A | 10/2017 | | |
| CN | 107387677 A | 11/2017 | | |
| CN | 108019471 A | 5/2018 | | |
| CN | 110185748 A | 8/2019 | | |
| CN | 111853167 A | 10/2020 | | |
| CN | 114251418 A | 3/2022 | | |
| CN | 115126845 A | 9/2022 | | |
| CN | 115431254 A | 12/2022 | | |
| CN | 115461968 A | 12/2022 | | |
| CN | 116221345 A | 6/2023 | | |
| CN | 117722482 A | 3/2024 | | |
| CN | 117869543 A | 4/2024 | | |
| DE | 102017126737 A1 * | 5/2019 | ............... | F16H 1/32 |
| GB | 2579204 A * | 6/2020 | ............... | F16H 1/32 |
| TW | 201627589 A | 8/2016 | | |
| TW | 202200330 A | 1/2022 | | |
| TW | 202407236 A | 2/2024 | | |

\* cited by examiner

CYCLOID SPEED REDUCER ASSEMBLY

CROSS-REFERENCE TO RELATED APPLICATION

This application claims the benefit of U.S. Provisional Application No. 63/631,617 filed on Apr. 9, 2024, and entitled "CYCLOID SPEED REDUCER ASSEMBLY". This application claims priority to China Patent Application No. 202411127813.7, filed on Aug. 16, 2024. The entireties of the above-mentioned patent applications are incorporated herein by reference for all purposes.

FIELD OF THE INVENTION

The present disclosure relates to a speed reducer, and more particularly to a cycloid speed reducer assembly including a cycloid speed reducer with a compact structure and capable of arranging an encoder between the speed reducer and the motor for closed-loop feedback control, so as to improve the control accuracy of the system.

BACKGROUND OF THE INVENTION

Currently on the market, the speed reducers commonly used in robotic arms can be roughly divided into two structural types: "cycloid speed reducer" and "harmonic speed reducer". Both of these reducers are lightweight, compact and have high reduction ratio characteristics.

The harmonic speed reducer includes a wave generator, a flexible gear and a rigid gear. The elastic deformation of the flexible gear can be controlled to result in a pushing action so as to transmit motion and power of mechanical transmission. The harmonic speed reducer has smaller size, lighter weight and higher precision when compared with the RV reducer. However, since the rigidity of the flexible gear of the harmonic speed reducer is low, the harmonic speed reducer is unable to withstand high impact and has a problem of causing teeth difference friction. In other words, the use life of the harmonic speed reducer is shorter.

Conventionally, the cycloid speed reducer includes an eccentric shaft and two cycloid discs. Each of the two cycloid discs includes at least one tooth. Moreover, the two cycloid discs are linked with a power input shaft and a power output shaft, respectively. During operations of the cycloid speed reducer, one cycloid disc is rotated with the power input shaft through the eccentric shaft, and the power output shaft is rotated with the other cycloid disc. Through the corresponding teeth, the two cycloid discs are correspondingly rotated. The conventional cycloid speed reducer has many benefits such as high transmission ratio, compact structure and high transmission efficiency. However, compared with the harmonic speed reducer, the conventional cycloid speed reducer still has a larger size and is not conducive to miniaturization.

On the other hand, when the reducer is used with a servo motor, it is often used in an open loop application, and the control accuracy is poor. In the conventional configuration of the servo motor and the reducer, the output end of the reducer and the motor are respectively located at the two opposite ends of the reducer. When an encoder needs to be added to the output end of the reducer for closed-loop feedback control, the design mechanism will become complicated and the cost will be increased a lot. Even the circuitry/routing is a difficult issue.

Therefore, there is a need of providing a cycloid speed reducer assembly capable of arranging an encoder between the speed reducer and the motor for closed-loop feedback control, so as to improve the control accuracy of the system, so as to the overcome the above drawbacks.

SUMMARY OF THE INVENTION

An object of the present disclosure is to provide a cycloid speed reducer assembly optimizing the component structure to realize the miniaturization application, and capable of arranging an encoder between the speed reducer and the motor for closed-loop feedback control, so as to improve the control accuracy of the system. By utilizing the sealing design of the front end and the rear end, the traditional end cover design is omitted to save the material costs and significantly reduce the overall volume of the cycloid speed reducer. Moreover, a spacer ring is placed between the front bearing and the rear bearing to prevent the front bearing and the rear bearing of the input shaft from affecting the transmission due to installation clearance errors, and the thickness of the spacer ring can be used to adjust the clearances of the front bearing and the rear bearing to facilitate the quantitative production and control the yield. Since the cycloid speed reducer of the present disclosure has a miniaturized structure and provides a front output end and a rear output end at two opposite ends, it facilitates to arrange an encoder between the speed reducer and the motor for closed-loop feedback control, so as to improve the control accuracy of the system. In the cycloid speed reducer assembly of the present disclosure, the encoder is disposed between the speed reducer and the motor, and it allows to provide the encoder feedback through the output end, thereby improving the control accuracy of the speed reducer. The application of the cycloid speed reducer assembly equipped with encoder feedback is generally applicable to general standard servo motors, and is competitive in terms of cost and convenience. On the other hand, since the cycloid speed reducer of the present disclosure provides the front output end and the rear output end at two opposite ends, it allows the cycloid speed reducer with the hollow input shaft to realize dual encoder applications. Furthermore, when a flexible structure is added to the output end, the flexible structure can be connected to another encoder. Through the combination of the output end of the reducer and the flexible structure, when the speed reducer outputs the torque, the flexible structure can be deformed by the force. By comparing the position error of the output encoder and another encoder connected to the flexible structure, the force can be calculated. Thus, the application of torque sensor is realized.

In accordance with an aspect of the present disclosure, a cycloid speed reducer assembly is provided and includes a cycloid speed reducer and a first encoder module. The cycloid speed reducer includes an input shaft, a cycloidal gear plate, a roller wheel assembly and an output plate. The input shaft is arranged along an axial direction and configured to connect a motor to receive a power input. The cycloidal gear plate includes a shaft hole and an outer tooth portion, wherein the shaft hole passes through the cycloidal gear plate along the axial direction, and is configured to be passed through by the input shaft, and the outer tooth portion is disposed on an outer periphery of the cycloidal gear plate. The roller wheel assembly is sleeved on the cycloidal gear plate and includes a plurality of rollers spatially corresponding to the outer tooth portion of the cycloidal gear plate. The output plate is arranged adjacent to the motor along the axial direction and connected to the cycloidal gear plate through an eccentric transmission shaft, wherein when the input shaft drives the outer tooth portion of the cycloidal gear plate to engage with the corresponding rollers of the roller wheel assembly, the cycloid gear plate is rotated with the eccentric transmission shaft, so that the output plate is driven by the eccentric transmission shaft to rotate. The first encoder module is disposed between the output plate of the cycloid speed reducer and the motor, and configured to measure a rotation of the output plate for feedback control.

In an embodiment, the output plate includes a first output plate and a second output plate, the first output plate and the second output plate are respectively located on two opposite outer sides of the roller wheel assembly, and each provides a power output, respectively, wherein the first output plate faces the motor, the first encoder module is disposed between the first output plate and the motor and configured to measure a rotation of the first output plate for feedback control.

In an embodiment, the first encoder module includes an encoder adapter board, an encoder and an encoder read head, the encoder adapter board is connected to the first output plate of the cycloid speed reducer to drive the encoder to output and rotate synchronously, and the encoder read head is spatially corresponding to the encoder and configured to measure a rotation speed of the first output plate for feedback control.

In an embodiment, the input shaft is a hollow input shaft, and the cycloid speed reducer assembly further includes a second encoder module, wherein the second encoder module is disposed at a rear end of the motor and includes a motor encoder and an encoder read head configured to measure a rotation speed of the second output plate or a rotation speed of a driving shaft of the motor for feedback control.

In an embodiment, the cycloid speed reducer assembly further includes a flexible structure and a third encoder module, wherein the third encoder module is arranged at the rear end of the motor, the flexible structure passes through the hollow input shaft, a front end of the flexible structure is connected to the first output plate, and a rear end of the flexible structure is disposed adjacent to the rear end of the motor and spatially corresponding to the third encoder module, wherein the flexible structure is configured to measure a rotational speed delay of the flexible structure caused by force deformation.

In an embodiment, the cycloid speed reducer assembly further includes a control module connected to the second encoder module and the third encoder module, wherein the control module compares an output of the second encoder module at the second output plate and an output of the third encoder module corresponding to the flexible structure to perform torque sensing.

In an embodiment, the cycloid speed reducer further includes a track base, a roller bearing and a sealing element. The track base is disposed on an outer side of the roller wheel assembly, and spatially corresponding to an outer peripheral wall of the output plate, wherein the track base is extended outward along the outer peripheral wall of the output plate to form an accommodation space between the track base and the outer peripheral wall of the output plate. The roller bearing is arranged between the output plate and the track base, and includes a plurality of rollers configured to run between the track base and the output plate. The sealing element is received within the accommodation space and tightly fitted between the track base and the output plate.

In an embodiment, the cycloid speed reducer further includes a deep groove bearing, a needle bearing and a spacer ring, wherein the input shaft includes a deep-groove-bearing connection section and a needle-bearing connection section, the deep groove bearing is connected between the deep-groove-bearing connection section and the output plate, the needle bearing is connected between the needle-bearing connection section and the cycloidal gear plate, and the deep groove bearing and the needle-bearing connection section are connected through the spacer ring.

In an embodiment, the spacer ring includes a first spacer section and a second spacer section connected to each other along the axial direction to form a stepped structure.

In an embodiment, an inner ring of the deep groove bearing interferes with the first spacer section for bearing, and the second spacer section interferes with the needle-bearing connection section for bearing.

In an embodiment, the first spacer section has a first spaced outer diameter, the second spacer section has a second spaced outer diameter, and the first spaced outer diameter is less than the second spaced outer diameter.

In an embodiment, the deep-groove-bearing connection section has a deep-groove-bearing inner diameter, the needle-bearing connection section connected to the needle bearing has a needle-bearing inner diameter, and an eccentricity value is formed by the relative distance between a central axis of the needle-bearing connection section and a central axis of the deep-groove-bearing connection section, wherein the first spaced outer diameter is greater than the sum of the deep-groove-bearing inner diameter and 1.5 mm, and is less than or equal to the needle-bearing inner diameter, wherein the second spaced outer diameter is greater than the sum of the first spaced outer diameter and 2 times the eccentricity value, and is less than or equal to the sum of the needle-bearing inner diameter, the difference between the needle-bearing inner diameter and the deep-groove-bearing inner diameter and 2 times the eccentricity value.

In accordance with an aspect of the present disclosure, a cycloid speed reducer assembly is provided and includes a motor, a cycloid speed reducer and a first encoder module. The motor includes a driving shaft configured to provide a power input. The cycloid speed reducer is spatially corresponding to the motor, and includes an input shaft, a cycloidal gear plate, a roller wheel assembly, a first output plate and a second output plate. The input shaft is arranged along an axial direction and configured to connect the driving shaft of the motor to receive the power input. The cycloidal gear plate includes a shaft hole and an outer tooth portion, wherein the shaft hole passes through the cycloidal gear plate along the axial direction, and is configured to be passed through by the input shaft, and the outer tooth portion is disposed on an outer periphery of the cycloidal gear plate. The roller wheel assembly is sleeved on the cycloidal gear plate and includes a plurality of rollers spatially corresponding to the outer tooth portion of the cycloidal gear plate. The first output plate and the second output plate are respectively located on two opposite outer sides of the roller wheel assembly and arranged adjacent to the motor along the axial direction, and connected to the cycloidal gear plate through an eccentric transmission shaft, wherein the first output plate faces the motor, wherein when the input shaft drives the outer tooth portion of the cycloidal gear plate to engage with the corresponding rollers of the roller wheel assembly, the cycloid gear plate is rotated with the eccentric transmission shaft, so that the first output plate and the second output plate are respectively driven by the eccentric transmission shaft to rotate, and each of the first output plate and the second output plate provides a power output. The first encoder module is disposed between the first output plate and the motor, and configured to measure a rotation of the first output plate for feedback control.

In an embodiment, the first encoder module includes an encoder adapter board, an encoder and an encoder read head, the encoder adapter board is connected to the first output plate of the cycloid speed reducer to drive the encoder to output and rotate synchronously, and the encoder read head is spatially corresponding to the encoder and configured to measure a rotation speed of the first output plate for feedback control.

In an embodiment, the input shaft is a hollow input shaft, and the cycloid speed reducer assembly further includes a second encoder module, wherein the second encoder module is disposed at a rear end of the motor and comprises a motor encoder and an encoder read head configured to measure a rotation speed of the second output plate or a rotation speed of the driving shaft for feedback control.

In an embodiment, the cycloid speed reducer assembly further includes a flexible structure and a third encoder module, wherein the third encoder module is arranged at the rear end of the motor, the flexible structure passes through the hollow input shaft, a front end of the flexible structure is connected to the first output plate, and a rear end of the flexible structure is disposed adjacent to the rear end of the motor and spatially corresponding to the third encoder module, wherein the flexible structure is configured to measure a rotational speed delay of the flexible structure caused by force deformation.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
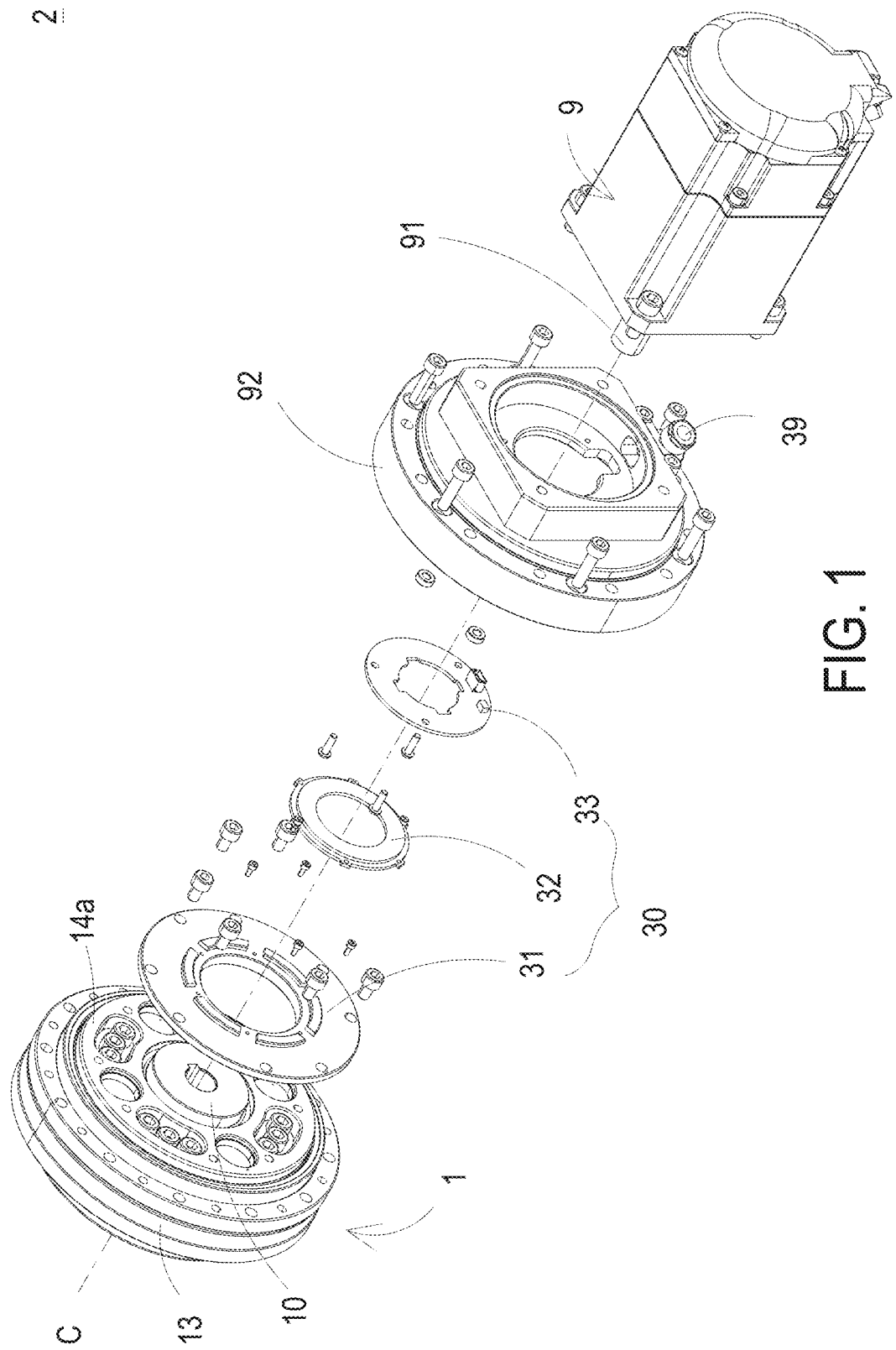
FIG. 1 is an exploded view illustrating a cycloid speed reducer assembly according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "front," "rear" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
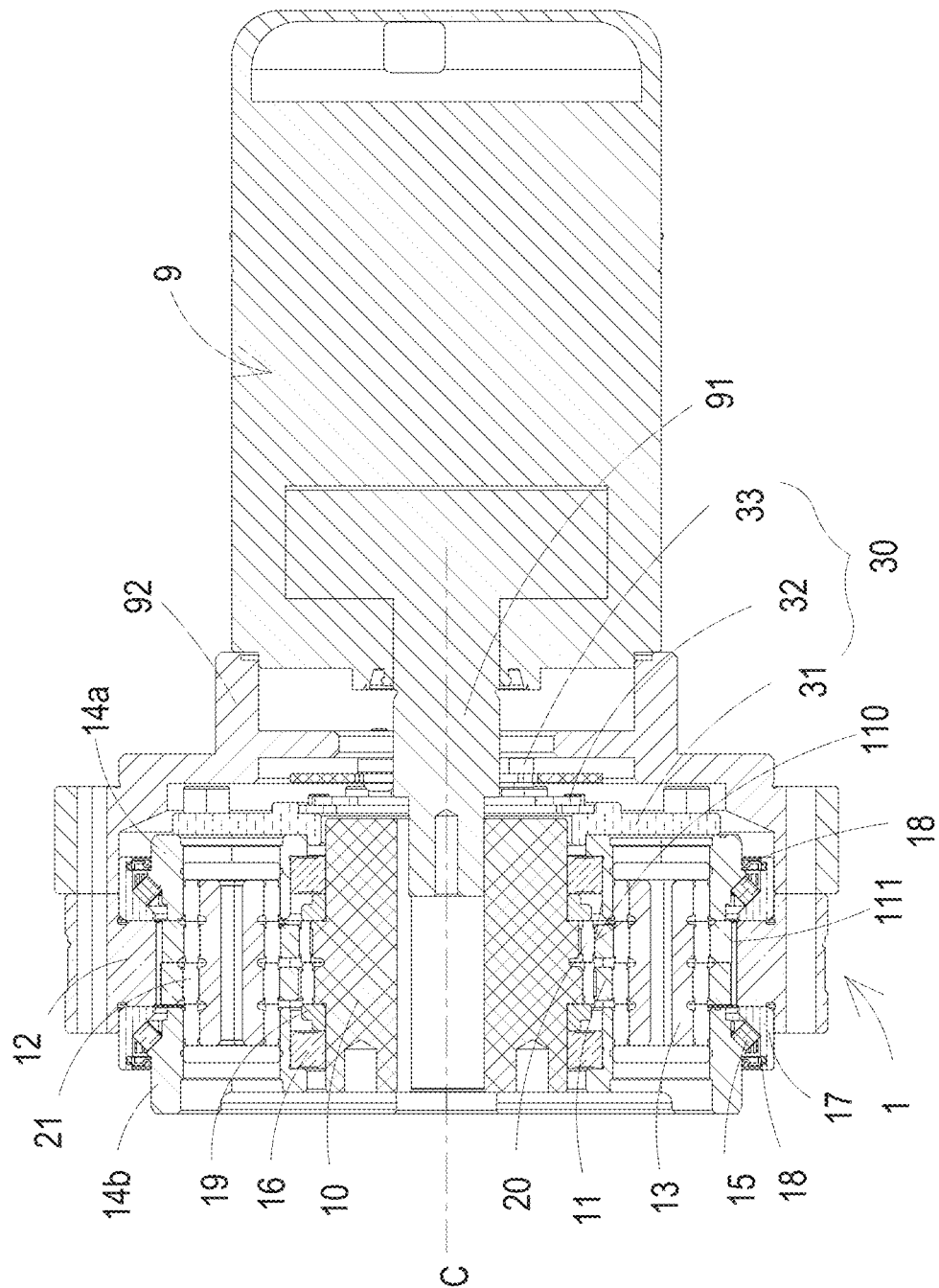
FIG. 2 is a cross-sectional view illustrating the cycloid speed reducer assembly according to the first embodiment of the present disclosure.
Figure 3:
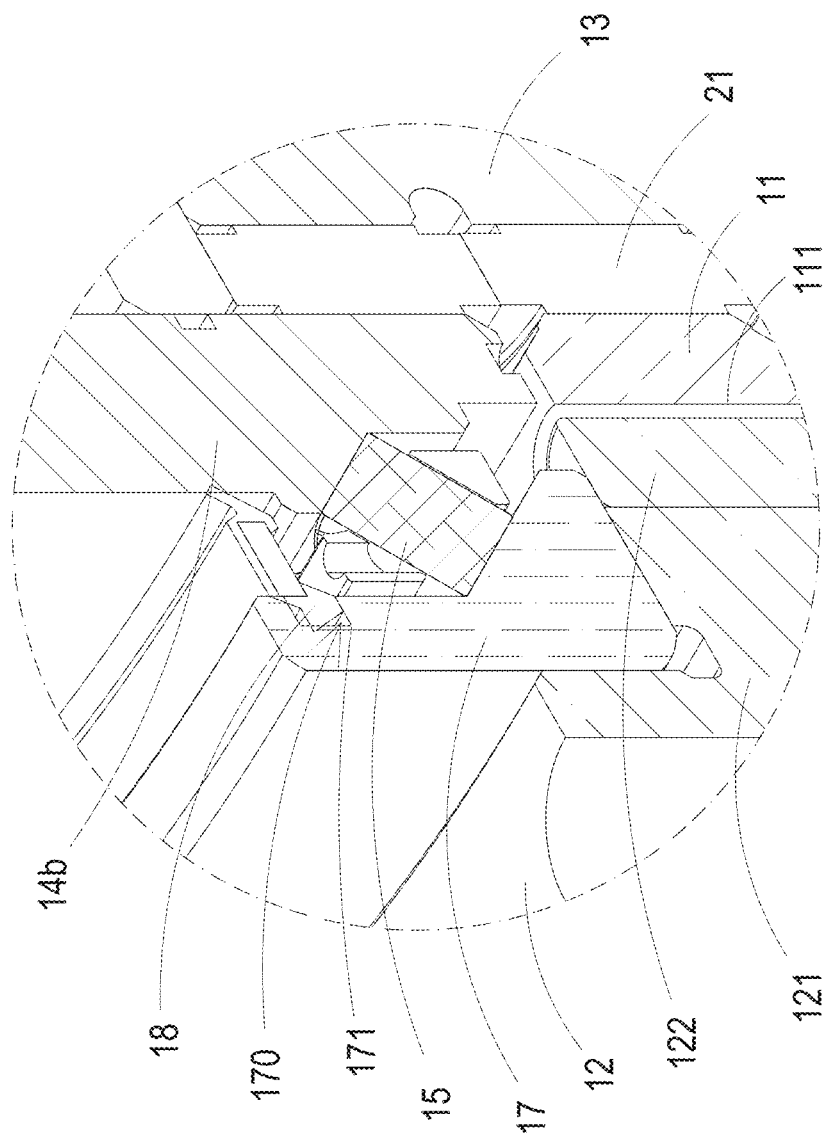
FIG. 3 is a cross-sectional structural view illustrating the portion of the cycloid speed reducer adjacent to the track bases according to the first embodiment of the present disclosure.

FIG. 1 is an exploded view illustrating a cycloid speed reducer assembly according to a first embodiment of the present disclosure. FIG. 2 is a cross-sectional view illustrating the cycloid speed reducer assembly according to the first embodiment of the present disclosure. FIG. 3 is a cross-sectional structural view illustrating the portion of the cycloid speed reducer adjacent to the track bases according to the first embodiment of the present disclosure. Please refer to FIG. 1 and FIG. 3. The present disclosure provides a cycloid speed reducer assembly 2. Preferably but not exclusively, the cycloid speed reducer 1 adopts a front-end and rear-end output design, and the first encoder module 30 is directly arranged between the output end of the cycloid speed reducer 1 and the motor 9 to perform closed-loop feedback control. In the embodiment, the cycloid speed reducer 1 includes an input shaft 10, a cycloidal gear plate 11, an eccentric transmission shaft 13, a first output plate 14a, a second output plate 14b and a roller wheel assembly 12. The roller wheel assembly 12 includes a wheel disc 121 and a plurality of rollers 122. The wheel disc 121 includes an opening (not shown), which is located at the substantial center position of the wheel disc 121 for a part of the input shaft 10, the cycloidal gear plate 11 and the eccentric transmission shaft 13 to pass through. The plurality of rollers 122 are disposed on the wheel disc 121. The input shaft 10 is arranged along an axial direction C. Preferably but not exclusively, the input shaft 10 is configured to receive a power input provided by, for example, a motor (not shown), and is driven to rotate by the power input. The cycloidal gear plate 11 includes a shaft hole 110 and an outer tooth portion 111. The shaft hole 110 is located at the substantial center position of the cycloidal gear plate 11 and spatially corresponding to the input shaft 10 in arrangement position. The shaft hole 110 is passed through by a part of the input shaft 10, so that the cycloidal gear plate 11 is sleeved on the input shaft 10. When the input shaft 10 is rotated, the cycloidal gear plate 11 is driven by the input shaft 10 to rotate. The roller wheel assembly 12 is sleeved on the cycloidal gear plate 11 and includes the plurality of rollers 122 spatially corresponding to the outer tooth portion 111 of the cycloidal gear plate 11. Preferably but not exclusively, the outer tooth portion 111 can be protruded from an outer periphery of the cycloidal gear plate 11. Moreover, the outer tooth portion 111 of the cycloidal gear plate 11 is in contact with the corresponding rollers 122 of the roller wheel assembly 12. When the power input provided by the motor is inputted through the input shaft 10, the outer tooth portion 111 of the cycloidal gear plate 11 is driven directly to engage with the corresponding rollers 122 of the roller wheel assembly 12.

In the embodiment, the cycloidal gear plate 11 is connected to the input shaft 10 through a needle bearing 20, and connected to the eccentric transmission shaft 13 through a needle bearing 21, respectively. Preferably but not exclusively, the eccentric transmission shaft 13 is a crankshaft including four eccentric sections with the same diameter, and there are five eccentric transmission shaft 13 in the cycloid speed reducer 1. Each transmission shaft 22 includes two concentric ends disposed at two opposite ends thereof and two eccentric ends arranged between the two concentric ends. The two eccentric ends are spatially corresponding to the cycloidal gear plate 11. When the cycloid gear plate 11 is driven by the input shaft 10 to rotate, the cycloidal gear plate 11 drives the eccentric transmission shaft 13 to rotate by connecting with the eccentric ends of the eccentric transmission shaft 13. In that, the concentric ends of the eccentric transmission shaft 13 are rotated synchronously, and the first output plate 14a and the second output plate 14b are driven by the concentric ends of the eccentric transmission shaft 13 to rotate respectively. The first output plate 14a and the second output plate 14b are located at two opposite outer ends of the cycloid speed reducer 1. Preferably but not exclusively, the first output plate 14a is disposed adjacent to the motor and can be regarded as the rear end of the cycloid speed reducer 1, and the second output plate 14b is disposed at another opposite end and regarded as the front end of the cycloid speed reducer 1. Certainly, the present disclosure is not limited thereto. In the embodiment, at least one of the first output plate 14a and the second output plate 14b can be used as the power output of the cycloid speed reducer 1.

In the embodiment, the first output plate 14a and the second output plate 14b are located at two opposite sides of the roller wheel assembly 12. In that, the cycloidal gear plate 11 is located between the first output plate 14a and the second output plate 14b. Preferably but not exclusively, both of the first output plate 14a and the second output plate 14b are served as the output end of the cycloid speed reducer 1 to provide the power output. In the embodiment, there are two sets of roller bearings 15, one set is arranged between the first output plate 14a and one side of the roller wheel assembly 12, and another set is arranged between the second output plate 14b and another opposite side of the roller wheel assembly 12. Two track bases 17 are disposed on two opposite sides of the wheel disc 121 of the roller wheel assembly 12, respectively. The two track bases 17 are spatially corresponding to the first output plate 14a and the second output plate 14b, respectively, and a parallelogram is collaboratively formed on a radial section so that the plurality of rollers in two sets of bearing rollers 15 are configured to run between the track base 17 and the first output plate 14a and between the track base 17 and the second output plate 14b.

Notably, in order to further realize the miniaturization, the design of the cycloid speed reducer 1 in the present disclosure further omits the conventional front-end and rear-end cover structures for sealing grooves. Taking the second output plate 14b as an example, the track base 17 is further extended outward along the outer peripheral wall of the second output plate 14b to form an accommodation space 170, which is configured to receive a sealing element 18. Through the accommodation space 170 formed by the track base 17, the sealing element 18 is tightly fitted between the track base 17 and the second output plate 14b to achieve the front end sealing of the cycloid speed reducer 1. Similarly, the track base 17 and the sealing element 18 mentioned above can be disposed correspondingly to the first output plate 14a, so that the rear end sealing of the cycloid speed reducer 1 is realized. Certainly, the manner in which the sealing element 18 is tightly fitted between the track base 17 and the first output plate 14a or between the track base 17 and the second output plate 14b can be adjusted according to the practical requirements. Preferably but not exclusively, the sealing element 18 is a sealing ring structure. The track base 17 further includes a groove 171 spatially corresponding to the accommodation space 170. The groove 171 is ring-shaped on an inner peripheral wall of the track base 17 and configured to engage with an outer peripheral edge of the sealing element 18. Certainly, the present disclosure is not limited thereto. Compared with the traditional sealing method of covering the ring teeth disk of the reducer with the front end cover and rear end cover installed, the accommodation space 170 for the seal element 18 is integrated into the track base 17, and the traditional end cover design can be omitted. It has higher flexibility in application. The difficulty of assembling the first encoder module 30 and the motor 9 is reduced. Certainly, the method of miniaturizing the cycloidal speed reducer 1 of the present disclosure is not limited thereto.

Notably, in the embodiment, the cycloid speed reducer 1 is spatially corresponding to the motor 9. The cycloid speed reducer assembly 2 further provides a first encoder module 30. The first encoder module 30 is directly disposed between the motor 9 and the first output plate 14a, which provides the power output from the rear end of the cycloid speed reducer 1. The first output plate 14a faces the motor 9. By sensing the output of the first output plate 14a through the first encoder module 30 for feedback control, the accuracy of the cycloid speed reducer 1 can be improved. Preferably but not exclusively, in the embodiment, the first encoder module 30 includes an encoder adapter board 31, an encoder 32 and an encoder read head 33. The encoder adapter board 31 is connected to the first output plate 14a of the cycloid speed reducer 1 to drive the encoder 32 to output and rotate synchronously. Preferably but not exclusively, the encoder 32 can be for example but not limited to an optical encoder or a magnetic encoder. In the embodiment, the encoder read head 33 is spatially corresponding to the encoder 32, and is configured to measure a rotation speed of the first output plate 14a for feedback control. In other embodiments, the encoder adapter board 31 and the encoder 32 are integrally formed into one piece. The present disclosure is not limited thereto. In the embodiment, the first output plate 14a and the second output plate 14b are both over-reduction ratios (i.e., output ends), and the first output plate 14a is located relatively at the rear end and disposed adjacent to the fixed housing 92 and the servo motor 9 installed. The outlet wire of the encoder module 30 can be led out through the encoder outlet terminal 39 on the fixed housing 92 and it not affected by the input shaft 10. It allows the driving shaft 91 of the motor 9 to pass through the encoder read head 33, the encoder 32 and the encoder adapter board 31, so as to be connected with the input shaft 10. In other words, the first encoder module 30 is arranged between the motor 9 and the cycloid speed reducer 1, and the installation cost is significantly reduced. The input shaft 10 is not limited to a hollow input shaft, and can be directly connected to a standard servo motor. Thereby, the cost is reduced and the convenience of use is improved. The product is economical/quick and easy to install.

In the embodiment, the input shaft 10 is directly driven by the power source input from the driving shaft 91 of the motor 9, so that the cycloidal gear plate 11 and the roller wheel assembly 12 are interacted with each other. Therefore, the stability of the input source is extremely important. In order to ensure the stability of the input shaft 10, the arrangement of deep grove bearings 16 is used to eliminate backlash and generate pre-pressure in the present disclosure. In the embodiment, the input shaft 10 and the first output plate 14a or/and the second output plate 14b are connected through the deep groove bearings 16. The cooperation between the shaft hole of the deep groove bearings 16 and the input shaft 10 is mainly an interference fit, so as to ensure the stability of the input shaft 10. However, the deep groove bearings 16 typically have large tolerances, and the accumulation of excessive tolerance values will not ensure that the assembled deep groove bearings 16 can generate overpressure to achieve the effects of eliminating backlash or generating pre-pressure. Therefore, in the present disclosure, a thickness of a spacer ring 19 is used to adjust the clearances, so as to solve the cumulative tolerance problem that is difficult to control in the bearings.

Figure 4:
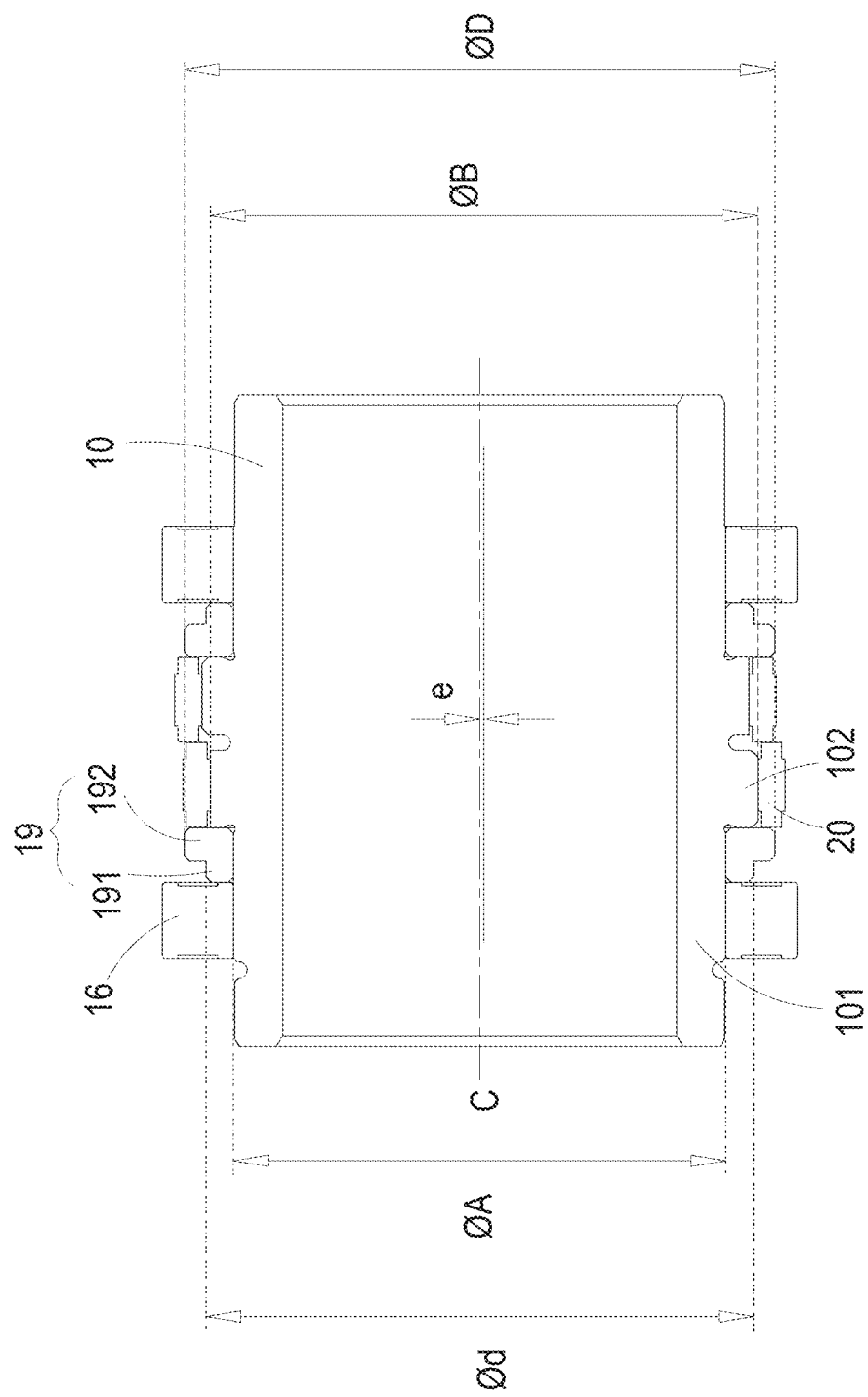
FIG. 4 is a cross-sectional view illustrating the dimensional relationship between the bearing, the spacer ring and the input shaft in the cycloid speed reducer of the first embodiment of the present disclosure.
Figure 5:
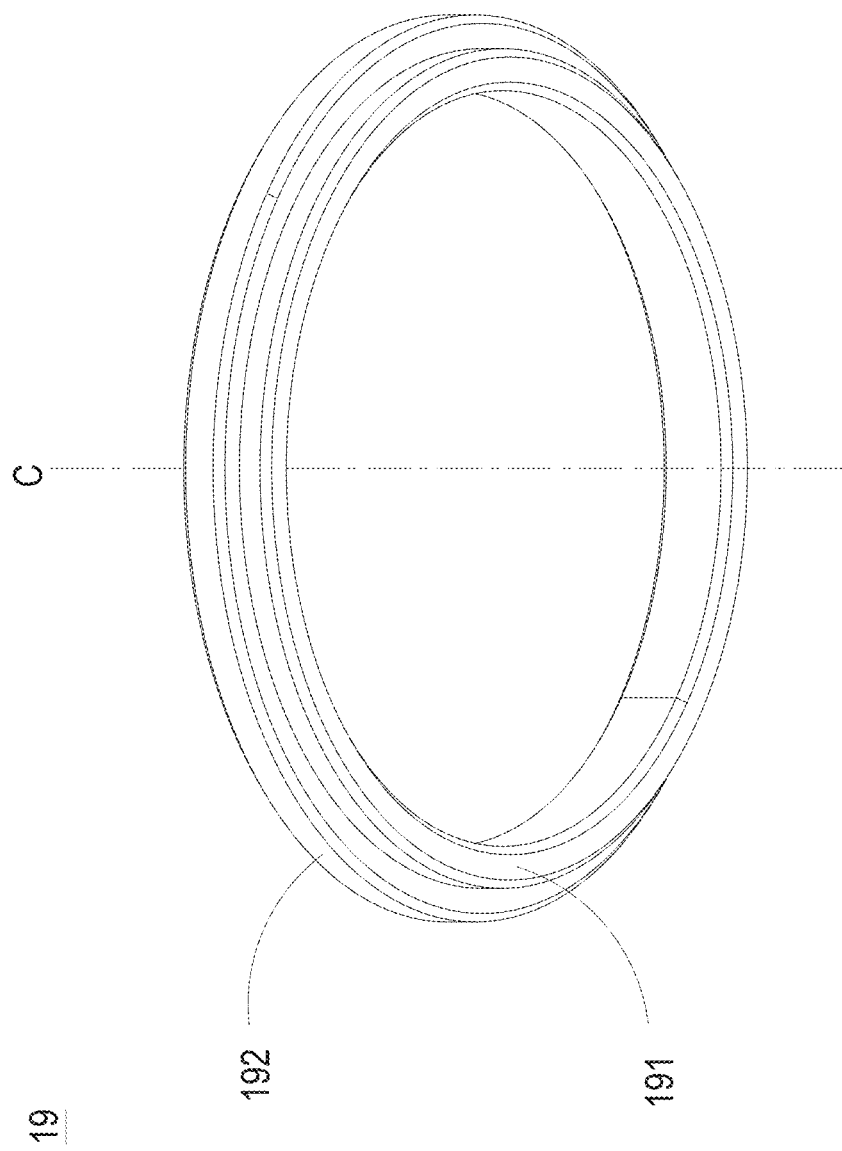
FIG. 5 is a perspective view illustrating the spacer ring of the cycloid speed reducer assembly according to the first embodiment of the present disclosure.

FIG. 4 is a cross-sectional view illustrating the dimensional relationship between the bearing, the spacer ring and the input shaft in the cycloid speed reducer of the embodiment of the present disclosure. FIG. 5 is a perspective view illustrating the spacer ring of the cycloid speed reducer according to the embodiment of the present disclosure. Please refer to FIG. 1 to FIG. 5. In the embodiment, the input shaft 10 includes a deep-groove-bearing connection section 101 and a needle-bearing connection section 102. The deep groove bearings 16 are connected the deep-groove-bearing connection section 101 and the first output plate 14a/the second output plate 14b. The needle bearing 20 is connected between the needle-bearing connection section 102 and the cycloidal gear plate 11. In the embodiment, the spacer ring 19 includes a first spacer section 191 and a second spacer section 192, which are connected to each other along the axial direction C to form a stepped structure. An outer rings of the bearings 16 interfere with the first output plate 14a and the second output plate 14b, respectively. An inner ring of the deep groove bearing 16 interferes with the first spacer section 191 of the spacer ring 19 for bearing, and the second spacer section 192 of the spacer ring 19 interferes with the needle-bearing connection section 102 of the input shaft 10 for bearing. In the embodiment, the first spacer section 191 has a first spaced outer diameter Ød that is less than a second spaced outer diameter ØD of the second spacer section 192. In the embodiment, the deep-groove-bearing connection section 101 connected to the deep groove bearing 16, and has a deep-groove-bearing inner diameter ØA. The needle-bearing connection section 102 connected to the needle bearing 20 has a needle-bearing inner diameter ØB, and an eccentricity value e is formed by the relative distance between the central axis of the needle-bearing connection section 102 and the central axis of the deep-groove-bearing connection section 101. In the embodiment, in order to ensure that the assembled deep groove bearings 16 can generate overpressure to achieve the effect of eliminating backlash or generating pre-pressure, the size of the spacer ring 19 is further designed to match the size of the input shaft 10. In the embodiment, the first spaced outer diameter Ød is greater than the sum of the deep-groove-bearing inner diameter ØA and a processing thickness. Preferably but not exclusively, the processing size is measured in mm, and the processing thickness can be for example 1.5 mm. Moreover, the first spaced outer diameter ØA is less than or equal to the needle-bearing inner diameter ØB, as shown in the following equation (1). In the embodiment, the second spaced outer diameter ØD is greater than the sum of the first spaced outer diameter Ød and 2 times the eccentricity value e, and is less than or equal to the sum of the needle-bearing inner diameter ØB, the difference between the needle-bearing inner diameter ØB and the deep-groove-bearing inner diameter ØA and 2 times the eccentricity value e, as shown in the following equation (2).

$$ØA + \text{processing thickness} < Ød \leq ØB \quad (1)$$

$$Ød + 2e \leq ØD \leq ØB + (ØB - ØA) + 2e \quad (2)$$

Certainly, the size design of the spacer ring 19 is adjustable according to the sizes of the deep groove bearings 16, the first output plate 14a or the second output plate 14b or the practical requirements, and the present disclosure is not limited thereto. In addition, notably, since the deep groove bearings 16 of the present disclosure are disposed inside the reducer, compared to the conventional structure in which the bearing is arranged on an aluminum cover, the structure of the input shaft 10 of the cycloid speed reducer 1 in the present disclosure has higher stability. The cycloid speed reducer 1 of the present disclosure will not have problems such as thermal expansion and interference forces caused by the bearing connected to the aluminum cover.

Figure 6:
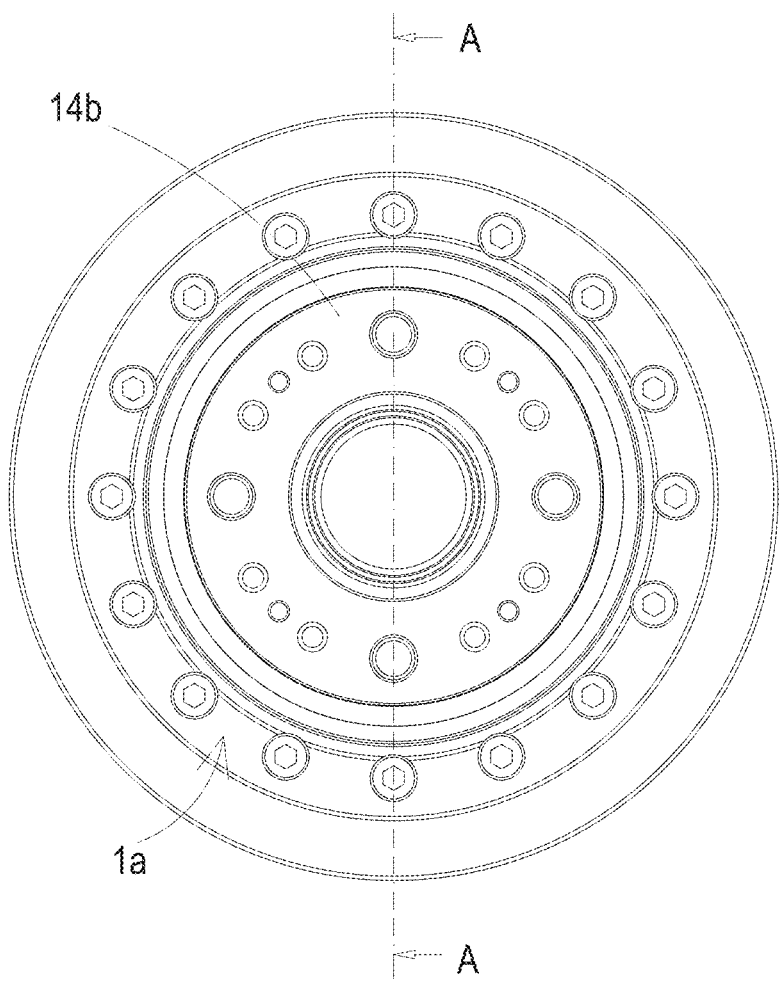
FIG. 6 is a front view illustrating a cycloid speed reducer assembly according to a second embodiment of the present disclosure.
Figure 7:
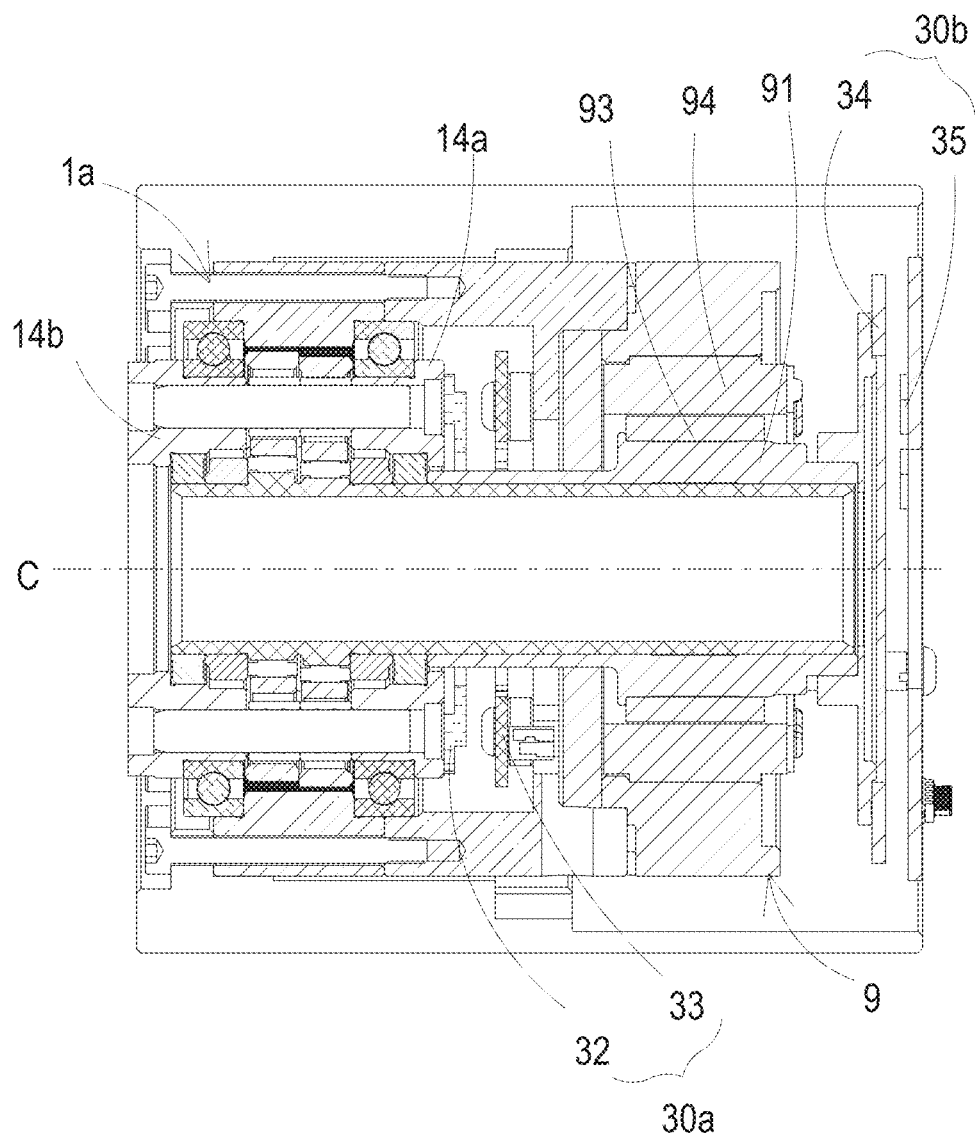
FIG. 7 is a cross-sectional view taken along the line AA of FIG. 6 and illustrating the cycloid speed reducer assembly according to the second embodiment of the present disclosure.

FIG. 6 is a front view illustrating a cycloid speed reducer assembly according to a second embodiment of the present disclosure. FIG. 7 is a cross-sectional view taken along the line AA of FIG. 6 and illustrating the cycloid speed reducer assembly according to the second embodiment of the present disclosure. In the embodiment, the cycloid speed reducer assembly 2a and the cycloid speed reducer 1a are similar to the cycloid speed reducer assembly 2 and the cycloid speed reducer 1 of FIGS. 1 to 5, elements with same structures and functions are denoted with same symbols, and are not redundantly described herein. In the embodiment, the cycloid speed reducer assembly 2a has an integrated structure. The input shaft 10 of the cycloid speed reducer 1a is a hollow input shaft. A first encoder module 30a is disposed between the first output plate 14a of the cycloid speed reducer 1a and the motor 9. The encoder 32 of the first encoder module 30a is connected to the first output plate 14a of the cycloid speed reducer 1a at the rear end. The encoder read head 33 is spatially corresponding to the encoder 32, and configured to measure a rotation speed of the first output plate 14a for feedback control. In the embodiment, the input shaft 10 of the cycloid speed reducer 1a and the driving shaft 91 of the motor 9 are both hollow in design, and the rotor 93 and the stator 94 of the motor 9 are sleeved outside the driving shaft 91. In the embodiment, the cycloid speed reducer assembly 2a includes the first encoder module 30a disposed between the cycloid speed reducer 1a and the motor 9, and further includes another set of second encoder module 30b added to the rear end of the overall structure, so that dual encoder modules are disposed on the cycloid speed reducer assembly 2a. Preferably but not exclusively, in the embodiment, the second encoder module 30b includes a motor encoder 34 and an encoder read head 35. Preferably but not exclusively, the motor encoder 34 is connected to the driving shaft 91, and the encoder read head 35 is spatially corresponding to the motor encoder 34 to measure a rotation speed of the driving shaft 91 for feedback control. Certainly, the combined application of dual encoder modules is not limited to this. Preferably but not exclusively, in other embodiments, the motor encoder 34 and the encoder read head 35 of the encoder module 30b are configured to measure a rotation speed of the second output plate 14b for feedback control. The present disclosure is not limited thereto.

Figure 8:
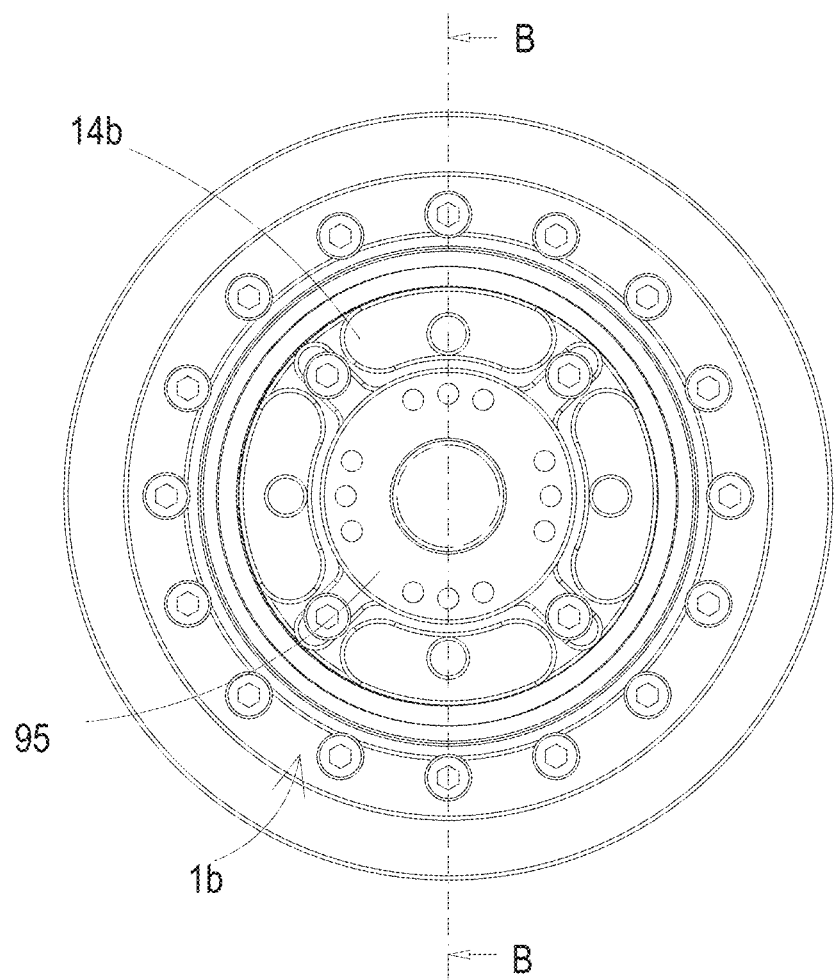
FIG. 8 is a front view illustrating a cycloid speed reducer assembly according to a third embodiment of the present disclosure.
Figure 9:
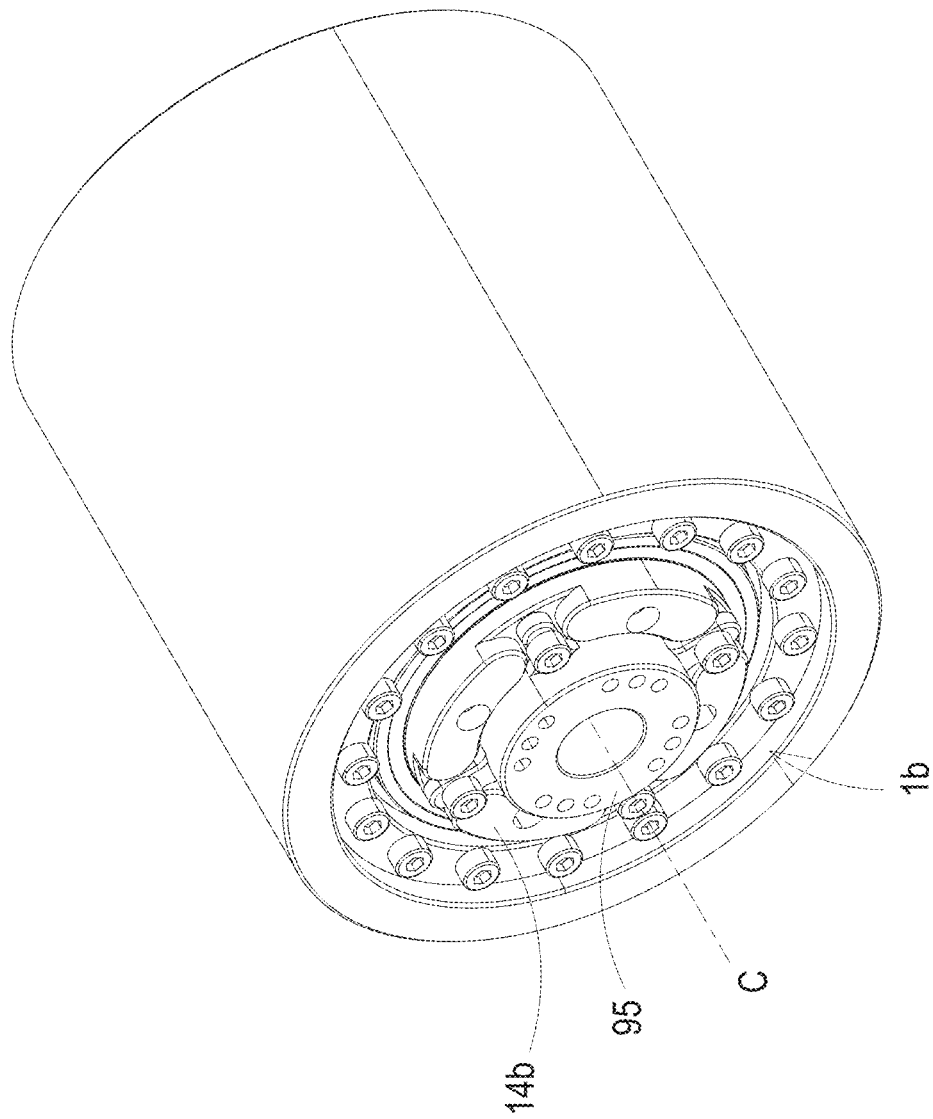
FIG. 9 is a perspective view illustrating the cycloid speed reducer assembly according to the third embodiment of the present disclosure.
Figure 10:
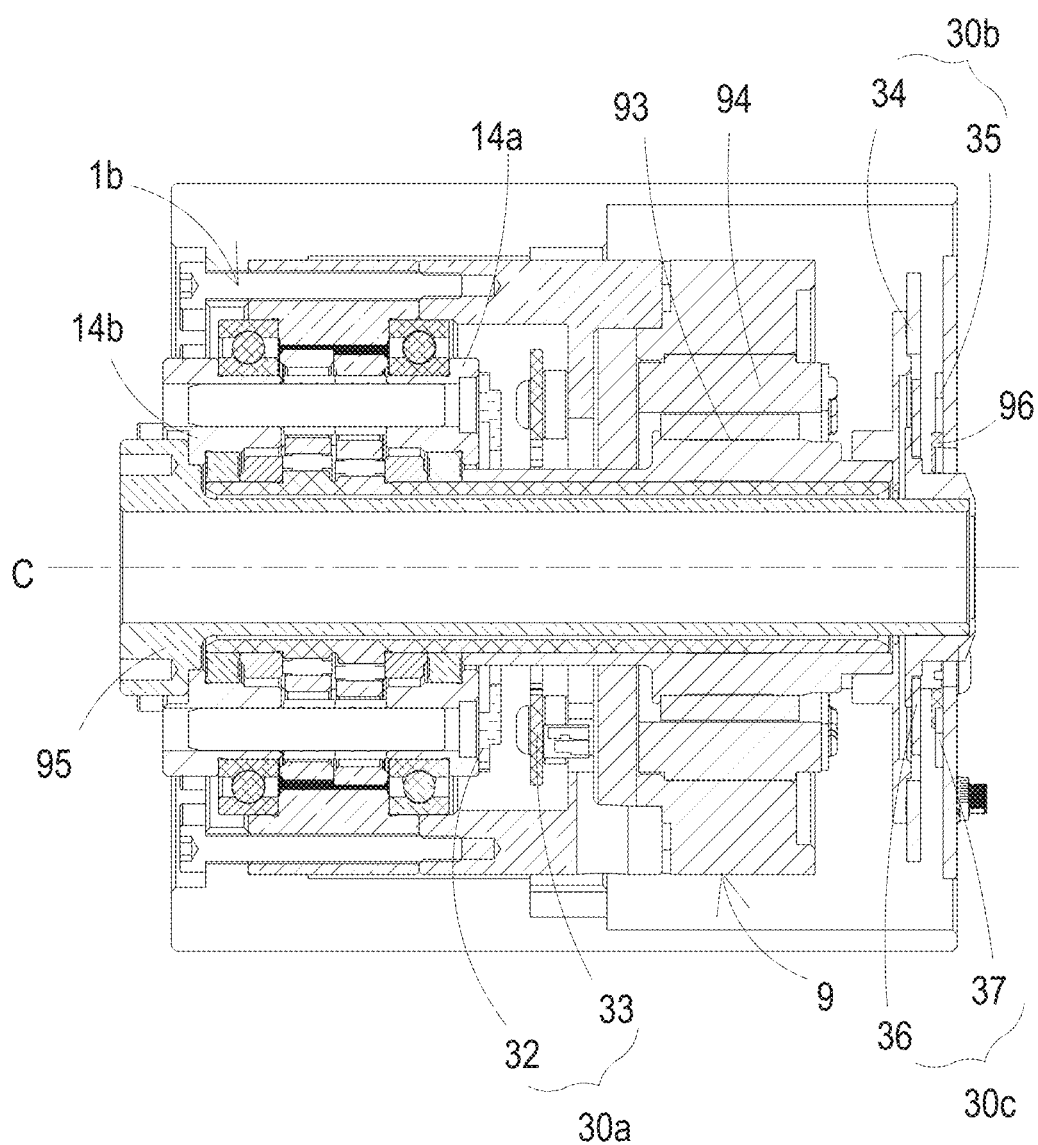
FIG. 10 is a cross-sectional view taken along the line BB of FIG. 9 and illustrating the cycloid speed reducer assembly according to the third embodiment of the present disclosure.

FIG. 8 is a front view illustrating a cycloid speed reducer assembly according to a third embodiment of the present disclosure. FIG. 9 is a perspective view illustrating the cycloid speed reducer assembly according to the third embodiment of the present disclosure. FIG. 10 is a cross-sectional view taken along the line BB of FIG. 9 and illustrating the cycloid speed reducer assembly according to the third embodiment of the present disclosure. In the embodiment, the cycloid speed reducer assembly 2b and the cycloid speed reducer 1b are similar to the cycloid speed reducer assembly 2a and the cycloid speed reducer 1a of FIGS. 6 to 7, elements with same structures and functions are denoted with same symbols, and are not redundantly described herein. In the embodiment, the cycloid speed reducer assembly 2b has an integrated structure, and further includes a flexible structure 95 passing through the hollow input shaft 10. A front end of the flexible structure 95 is connected to the second output plate 14b at the front end of the cycloid speed reducer 1b. A rear end of the flexible structure 95 is disposed adjacent to the rear end of the motor 9, and spatially corresponding to a third encoder module 30c, which is arranged at the rear end of the motor 9 and configured to measure a rotational speed delay of the flexible structure 95 caused by force deformation. In the embodiment, the third encoder module 30c includes an encoder 36 and encoder read head 37. Preferably but not exclusively, the encoder 36 is connected to the rear end of the flexible structure 95, and the encoder read head 37 spatially corresponding to the encoder 36 is for example disposed on the same circuit board as the encoder read head 35, so as to make better use of space. The encoder read head 37 is combined with the encoder 36 to measure, so that the third encoder module 30c is installed on the integrated cycloid speed reducer assembly 2b. In the embodiment, the second output plate 14b is served as the reducer output end and combined with the flexible structure 95. After the second output plate 14b outputs the torque, the front end of the flexible structure 95 is deformed by force. The third encoder module 30c at the rear end of the flexible structure 95 can measure a rotational speed delay caused of the flexible structure 95 by force deformation. In the embodiment, the cycloid speed reducer assembly 2b further includes a control module 96 connected to the second encoder module 30b and the third encoder module 30c. The control module 96 compares an output of the second encoder module 30b at the second output plate 14b and an output of the third encoder module 30c corresponding to the flexible structure 96 to perform torque sensing. By comparing the position error of the encoder module 30b at the second output plate 14b and the third encoder module 30c connected to the flexible structure 95, the force can be calculated. Thus, the application of torque sensor is realized. Certainly, the position of the control module 96 is adjustable according to the practical requirements. The present disclosure is not limited thereto and not redundantly described herein.

In summary, the present disclosure provides a cycloid speed reducer assembly optimizing the component structure to realize the miniaturization application, and capable of arranging an encoder between the speed reducer and the motor for closed-loop feedback control, so as to improve the control accuracy of the system. By utilizing the sealing design of the front end and the rear end, the traditional end cover design is omitted to save the material costs and significantly reduce the overall volume of the cycloid speed reducer. Moreover, a spacer ring is placed between the front bearing and the rear bearing to prevent the front bearing and the rear bearing of the input shaft from affecting the transmission due to installation clearance errors, and the thickness of the spacer ring can be used to adjust the clearances of the front bearing and the rear bearing to facilitate the quantitative production and control the yield. Since the cycloid speed reducer of the present disclosure has a miniaturized structure and provides a front output end and a rear output end at two opposite ends, it facilitates to arrange an encoder between the speed reducer and the motor for closed-loop feedback control, so as to improve the control accuracy of the system. In the cycloid speed reducer assembly of the present disclosure, the encoder is disposed between the speed reducer and the motor, and it allows to provide the encoder feedback through the output end, thereby improving the control accuracy of the speed reducer. The application of the cycloid speed reducer assembly equipped with encoder feedback is generally applicable to general standard servo motors, and is competitive in terms of cost and convenience. On the other hand, since the cycloid speed reducer of the present disclosure provides the front output end and the rear output end at two opposite ends, it allows the cycloid speed reducer with the hollow input shaft to realize dual encoder applications. Furthermore, when a flexible structure is added to the output end, the flexible structure can be connected to another encoder. Through the combination of the output end of the reducer and the flexible structure, when the speed reducer outputs the torque, the flexible structure can be deformed by the force. By comparing the position error of the output encoder and another encoder connected to the flexible structure, the force can be calculated. Thus, the application of torque sensor is realized.

While the disclosure has been described in terms of what is presently considered to be the most practical and preferred embodiments, it is intended to cover various modifications and similar arrangements included within the spirit and scope of the appended claims which are to be accorded with the broadest interpretation so as to encompass all such modifications and similar structures.

What is claimed is:

1. A cycloid speed reducer assembly, comprising:
a cycloid speed reducer comprising:
an input shaft arranged along an axial direction and configured to connect a motor to receive a power input;
a cycloidal gear plate comprising a shaft hole and an outer tooth portion, wherein the shaft hole passes through the cycloidal gear plate along the axial direction, and is configured to be passed through by the input shaft, and the outer tooth portion is disposed on an outer periphery of the cycloidal gear plate;
a roller wheel assembly sleeved on the cycloidal gear plate and comprising a plurality of rollers spatially corresponding to the outer tooth portion of the cycloidal gear plate; and
an output plate arranged adjacent to the motor along the axial direction and connected to the cycloidal gear plate through an eccentric transmission shaft, wherein when the input shaft drives the outer tooth portion of the cycloidal gear plate to engage with the corresponding rollers of the roller wheel assembly, the cycloid gear plate is rotated with the eccentric transmission shaft, so that the output plate is driven by the eccentric transmission shaft to rotate, wherein the output plate comprises a first output plate and a second output plate, the first output plate and the second output plate are respectively located on two opposite outer sides of the roller wheel assembly, and each provides a power output, respectively, wherein the first output plate faces the motor, a first encoder module is disposed between the first output plate and the motor and configured to measure a rotation of the first output plate for feedback control;
and
a second encoder module disposed at a rear end of the motor and configured to measure a rotation speed of the second output plate or a rotation speed of a driving shaft of the motor for feedback control.

2. The cycloid speed reducer assembly according to claim 1, wherein the first encoder module comprises an encoder adapter board, an encoder and an encoder read head, the encoder adapter board is connected to the first output plate of the cycloid speed reducer to drive the encoder to output and rotate synchronously, and the encoder read head is spatially corresponding to the encoder and configured to measure a rotation speed of the first output plate for feedback control.

3. The cycloid speed reducer assembly according to claim 2, wherein the input shaft is a hollow input shaft, wherein the second encoder module comprises a motor encoder and an encoder read head configured to measure a rotation speed of the second output plate or a rotation speed of a driving shaft of the motor for feedback control.

4. The cycloid speed reducer assembly according to claim 3, further comprising a flexible structure and a third encoder module, wherein the third encoder module is arranged at the rear end of the motor, the flexible structure passes through the hollow input shaft, a front end of the flexible structure is connected to the first output plate, and a rear end of the flexible structure is disposed adjacent to the rear end of the motor and spatially corresponding to the third encoder module, wherein the flexible structure is configured to measure a rotational speed delay of the flexible structure caused by force deformation.

5. The cycloid speed reducer assembly according to claim 4, further comprising a control module connected to the second encoder module and the third encoder module, wherein the control module compares an output of the second encoder module at the second output plate and an output of the third encoder module corresponding to the flexible structure to perform torque sensing.

6. The cycloid speed reducer assembly according to claim 1, wherein the cycloid speed reducer further comprises:
a track base disposed on an outer side of the roller wheel assembly, and spatially corresponding to an outer peripheral wall of the output plate, wherein the track base is extended outward along the outer peripheral wall of the output plate to form an accommodation space between the track base and the outer peripheral wall of the output plate;
a roller bearing arranged between the output plate and the track base, and comprising a plurality of rollers configured to run between the track base and the output plate; and
a sealing element received within the accommodation space and tightly fitted between the track base and the output plate.

7. The cycloid speed reducer assembly according to claim 1, wherein the cycloid speed reducer further comprises a deep groove bearing, a needle bearing and a spacer ring, wherein the input shaft includes a deep-groove-bearing connection section and a needle-bearing connection section, the deep groove bearing is connected between the deep-groove-bearing connection section and the output plate, the needle bearing is connected between the needle-bearing connection section and the cycloidal gear plate, and the deep groove bearing and the needle-bearing connection section are connected through the spacer ring.

8. The cycloid speed reducer assembly according to claim 7, wherein the spacer ring comprises a first spacer section and a second spacer section connected to each other along the axial direction to form a stepped structure.

9. The cycloid speed reducer assembly according to claim 8, wherein an inner ring of the deep groove bearing interferes with the first spacer section for bearing, and the second spacer section interferes with the needle-bearing connection section for bearing.

10. The cycloid speed reducer assembly according to claim 8, wherein the first spacer section has a first spaced outer diameter, the second spacer section has a second spaced outer diameter, and the first spaced outer diameter is less than the second spaced outer diameter.

11. The cycloid speed reducer assembly according to claim 10, wherein the deep-groove-bearing connection section has a deep-groove-bearing inner diameter, the needle-bearing connection section connected to the needle bearing has a needle-bearing inner diameter, and an eccentricity value is formed by the relative distance between a central axis of the needle-bearing connection section and a central axis of the deep-groove-bearing connection section, wherein the first spaced outer diameter is greater than the sum of the deep-groove-bearing inner diameter and 1.5 mm, and is less than or equal to the needle-bearing inner diameter, wherein the second spaced outer diameter is greater than the sum of the first spaced outer diameter and 2 times the eccentricity value, and is less than or equal to the sum of the needle-bearing inner diameter, the difference between the needle-bearing inner diameter and the deep-groove-bearing inner diameter and 2 times the eccentricity value.

12. A cycloid speed reducer assembly, comprising:
a motor comprising a driving shaft configured to provide a power input;
a cycloid speed reducer spatially corresponding to the motor and comprising:
- an input shaft arranged along an axial direction and configured to connect the driving shaft of the motor to receive the power input;
- a cycloidal gear plate comprising a shaft hole and an outer tooth portion, wherein the shaft hole passes through the cycloidal gear plate along the axial direction, and is configured to be passed through by the input shaft, and the outer tooth portion is disposed on an outer periphery of the cycloidal gear plate;
- a roller wheel assembly sleeved on the cycloidal gear plate and comprising a plurality of rollers spatially corresponding to the outer tooth portion of the cycloidal gear plate; and
- a first output plate and a second output plate respectively located on two opposite outer sides of the roller wheel assembly and arranged adjacent to the motor along the axial direction, and connected to the cycloidal gear plate through an eccentric transmission shaft, wherein the first output plate faces the motor, wherein when the input shaft drives the outer tooth portion of the cycloidal gear plate to engage with the corresponding rollers of the roller wheel assembly, the cycloid gear plate is rotated with the eccentric transmission shaft, so that the first output plate and the second output plate are respectively driven by the eccentric transmission shaft to rotate, and each of the first output plate and the second output plate provides a power output;
- a first encoder module disposed between the first output plate and the motor, and configured to measure a rotation of the first output plate for feedback control; and
- a second encoder module disposed at a rear end of the motor and configured to measure a rotation speed of the second output plate or a rotation speed of the driving shaft of the motor for feedback control.

13. The cycloid speed reducer assembly according to claim 12, wherein the first encoder module comprises an encoder adapter board, an encoder and an encoder read head, the encoder adapter board is connected to the first output plate of the cycloid speed reducer to drive the encoder to output and rotate synchronously, and the encoder read head is spatially corresponding to the encoder and configured to measure a rotation speed of the first output plate for feedback control.

14. The cycloid speed reducer assembly according to claim 12, wherein the input shaft is a hollow input shaft, wherein the second encoder module comprises a motor encoder and an encoder read head configured to measure a rotation speed of the second output plate or a rotation speed of the driving shaft for feedback control.

15. The cycloid speed reducer assembly according to claim 14, further comprising a flexible structure and a third encoder module, wherein the third encoder module is arranged at the rear end of the motor, the flexible structure passes through the hollow input shaft, a front end of the flexible structure is connected to the first output plate, and a rear end of the flexible structure is disposed adjacent to the rear end of the motor and spatially corresponding to the third encoder module, wherein the flexible structure is configured to measure a rotational speed delay of the flexible structure caused by force deformation.

* * * * *